(12) United States Patent
Thøgersen

(10) Patent No.: US 9,493,251 B2
(45) Date of Patent: Nov. 15, 2016

(54) SECURITY CHECK METHOD AND SYSTEM

(75) Inventor: Lars Thøgersen, Copenhagen S (DK)

(73) Assignee: UDVIKLINGSSELSKABET AF 2014 A/S, Copenhagen (DK)

( * ) Notice: Subject to any disclaimer, the term of this patent is extended or adjusted under 35 U.S.C. 154(b) by 0 days.

(21) Appl. No.: 13/821,540

(22) PCT Filed: Sep. 8, 2011

(86) PCT No.: PCT/EP2011/065534
§ 371 (c)(1),
(2), (4) Date: Jul. 8, 2013

(87) PCT Pub. No.: WO2012/032108
PCT Pub. Date: Mar. 15, 2012

(65) Prior Publication Data
US 2013/0276388 A1    Oct. 24, 2013

(30) Foreign Application Priority Data

Sep. 8, 2010 (EP) .................................... 10175776

(51) Int. Cl.
*G06F 7/04* (2006.01)
*B64F 1/36* (2006.01)
(Continued)

(52) U.S. Cl.
CPC ................ *B64F 1/36* (2013.01); *B64F 1/366* (2013.01); *G01V 5/0016* (2013.01); *B62B 3/1488* (2013.01); *B62B 2501/065* (2013.01)

(58) Field of Classification Search
CPC ...... G01N 23/04; G06Q 20/00; G06Q 10/00; G07F 7/06
USPC ....... 340/5.2, 539.13, 980; 378/57; 324/627; 705/7.13, 23; 235/382; 194/212
See application file for complete search history.

(56) References Cited

U.S. PATENT DOCUMENTS 4,353,564 A * 10/1982 Joseloff ........................ 280/79.3
4,424,893 A * 1/1984 Gillet ............................ 194/212
(Continued)

FOREIGN PATENT DOCUMENTS

DE    20 2011 051 934 U1    2/2012
WO    WO 03/042814 A2    5/2003
(Continued)

OTHER PUBLICATIONS

"FAST (Flight Assistant Security Trolley) & Airport Timer," D-Vision, 2010, 7 pages.
(Continued)

*Primary Examiner* — Vernal Brown
(74) *Attorney, Agent, or Firm* — Muncy, Geissler, Olds & Lowe, P.C.

(57) ABSTRACT

A method and a system for transferring a person and the person's carry-on items from a site upstream of a security check point to a site downstream of the security check point comprises loading the person's carry-on items onto a trolley at the upstream site, separating the person from the trolley at the upstream site, and subsequently x-raying the trolley at the security check point while the carry-on items remain loaded onto the trolley, and while a security check of the person is performed. Subsequently, the person and the trolley are united, while the carry-on items remain loaded onto the trolley. The trolley may be made from non-metallic material, such as plastics composite materials, and may optionally comprise a display monitor for displaying user-specific information. The invention is particularly useful for promoting security checks at airports.

7 Claims, 4 Drawing Sheets

(51) Int. Cl.
*G01V 5/00* (2006.01)
*B62B 3/14* (2006.01)

(56) References Cited

U.S. PATENT DOCUMENTS

| | | | | |
|---|---|---|---|---|
| 5,921,373 | A * | 7/1999 | Amdahl et al. | 194/213 |
| 6,820,062 | B1 * | 11/2004 | Gupta | B62B 3/1408 705/16 |
| 7,292,158 | B2 * | 11/2007 | Wieth et al. | 340/988 |
| 8,688,496 | B1 * | 4/2014 | Tansupaswatdikul et al. | 705/7.13 |
| 2005/0193648 | A1 | 9/2005 | Klein et al. | |
| 2007/0004333 | A1 * | 1/2007 | Kavanti | 455/3.06 |
| 2008/0243626 | A1 * | 10/2008 | Stawar et al. | 705/23 |
| 2009/0041186 | A1 * | 2/2009 | Gray | 378/57 |
| 2009/0153322 | A1 * | 6/2009 | Gough | 340/539.13 |
| 2009/0243629 | A1 * | 10/2009 | Tang et al. | 324/627 |
| 2009/0284343 | A1 * | 11/2009 | Ambrefe et al. | 340/5.2 |
| 2010/0023257 | A1 * | 1/2010 | Machino | 701/201 |
| 2010/0308108 | A1 * | 12/2010 | Choi et al. | 235/382 |
| 2012/0296751 | A1 * | 11/2012 | Napper | 705/23 |

FOREIGN PATENT DOCUMENTS

| | | |
|---|---|---|
| WO | WO 2006/074431 A2 | 7/2006 |
| WO | WO 2009/064206 A2 | 5/2009 |

OTHER PUBLICATIONS

Starke, "Uni-Absolventen nehmen Fluggästen den Stress," Berliner Morgenpost, Jul. 19, 2010, 2 pages.
Starke, "Ein Besuch bei den Tüftlern von Potsdam," Berliner Morgenpost, Jul. 18, 2010, 2 pages.
Joel et al, "FAST—Vom Stop-and-Go Zum Flow," Jun. 30, 2011, 13 pages.
"Utensilien-Wägelchen für mehr Komfort," Handling Online, Jul. 21, 2010, 1 page.
"HPI-Innovationsschule präsentiert Projekte: Neues System für Airport-Sicherheitskontrollen entwickelt," Innovations Report, Jul. 16, 2010, 2 pages.
"Check ohne Stress," Innovations Report, Aug. 12, 2010, 1 page.
"Potsdamer Studenten entwickeln Rollwagen für Flug-Handgepäck," Lausitzer Rundschau, Jul. 17, 2010, 1 page.
Matern, "Rollen statt warten," PNN, Jul. 21, 2010, 2 pages.
"Schneller durch den Sicherheits-Check an Flughäfen mit neuem System," Pressemitteilung, Jul. 16, 2010, 2 pages, HassoPlattner Institut (HPI) IT Systems Engineering—Universität Potsdam.
Dyk, "Quer gedacht durch die Fachgebiete," SVZ, Jul. 17, 2010, 2 pages.
Weigmann, "Der Spagat zwischen Sicherheit und Wirtschaftlichkeit," WIK, Oct. 10, 2010, 5 pages.
https://www.hpi.uni-potsdam.de/fileadmin/hpi/Pressemitteilungen_2010/10.07.16_D-Vision12Airport%20Security.pdf Lines 1-7, 23-25, and 30-35.
http://www.handling.de/news/utensilien-waegelchen-fuer-mehr-komfort.htm Lines 5-10, 19-21, and 24-28.
http://www.svz.de/bb-uebersicht/quer-gedacht-durch-die-fachgebiete-id4872081.html Lines 32-35.
http://www.morgenpost.de/brandenburg-aktuell/article1351617/Ein-Besuch-bei-den-Tueftlern-von-Potsdam.html Lines 22-29.
http://www.tele-task.de/archive/lecture/overview/5226/ History 8:30-10:30 minute mark, Introduction of FAST 10:30-11:51 minute mark.
http://www.pnn.de/potsdam/311989/ Lines 19-24.

* cited by examiner

SECURITY CHECK METHOD AND SYSTEM

TECHNICAL FIELD

The present invention relates to a method and a system for facilitating the flow of persons and the persons' carry-on items through a security check point. The invention is in particular aimed at security check points at airports, however other fields of use are envisaged, such as the use in the premises of public or private enterprises, court houses, schools, etc., at which it may be required to x-ray the carry-on items, notably the hand luggage, of persons seeking access to a zone accessible only via one or more security check points.

BACKGROUND OF THE INVENTION

The number of airplane passengers has increased steadily over the past decades, and this in combination with increasing public focus on measures to prevent terrorism, industrial espionage and other crime amplify demands on security systems, including systems for restricting access to certain high-risk zones, such as airplanes, airport departure terminals, court houses, public administration premises, production facilities, and even schools.

Traditionally, an access-restricting security check point comprises a conveyor belt running through an x-ray tunnel, through which carry-on items, such as hand luggage, are conveyed while a security officer monitors the x-ray images obtained. At the same time, the person, who is the owner of carry-on items being x-rayed, may walk through a metal detector, and an optional manual search for weapons, explosives or drugs is typically carried out subsequently. The person is finally united with his/her carry-on items beyond the security check point, i.e. within the restricted zone.

In order to ensure proper x-ray imaging, it is often required that laptops are removed from the owner's luggage and placed in a separate tray away from the luggage, and other items, such as shoes, belts, wallets and containers for liquids are often x-rayed separately as well.

The flow of passengers through a security check point in an example of a prior art airport terminal is illustrated by arrows in FIG. 1. As shown, the passengers initially pass a control check point, at which the passengers' id and/or boarding cards are checked or verified. Subsequently, the passengers queue at a security check point 100, comprising, in the example shown, four x-ray imaging scanners 102 at four parallel security check lines. At the downstream side of the security check point 100, the passengers may pick up a miniature luggage trolley for their hand luggage and optionally further items shopped at the security-restricted zone of the airport departure terminal.

The flow of persons 110 and their carry-on items (not shown) in the prior art security check point system 100 of FIG. 1 is generally depicted in FIG. 2. The check point comprises an overhead x-ray imaging scanner 102 positioned over a conveyor belt 104. The carry-on items may be placed directly on the belt 104, or in trays 106 conveyed along the belt and recycled via recycling conveyor 108. A first security officer 112 monitors the output images of the x-ray scanner 102, a second security officer 114 performs an optional manual search or scanning of persons 110, and a third security officer 116 ensures proper placement of emptied trays 106 onto the recycling conveyor 108. A stationary metal detector 118 is provided for detecting metal objects at the body of persons walking there through.

The above-mentioned security measures do not only lead to delays in the flow of persons through a security check point, but also put a significant cost burden on airport operators, and ultimately on the passengers. Further, persons who have completed a security check, frequently forget to assemble all of their belongings, and the risk of theft is imminent on the downstream side of a security check point.

It is accordingly an object of embodiments of the present invention to provide a method and a system, which promotes the flow of persons through a security check point. It is a further object of embodiments of the invention to provide a system and a method, which reduces the degree of inconvenience experienced by the users passing through a security check point.

SUMMARY OF THE INVENTION

In a first aspect, the invention provides a method for transferring a person and the person's carry-on items from a site upstream of a security check point to a site downstream of the security check point, the method comprising the steps of:

loading the person's carry-on items onto a trolley at said upstream site;

separating the person from the trolley at said upstream site; and subsequently:

x-raying the trolley at said security check point while the carry-on items remain loaded onto the trolley;

performing a security check of the person at said security check point; and subsequently:

uniting the person and the trolley, while the carry-on items remain loaded onto the trolley.

In a second aspect, the invention provides a system for facilitating the transfer of persons and the persons' carry-on items from a site upstream of a security check point to a site downstream of the security check point, the system comprising:

a plurality of trolleys, each of which is configured to be loaded with one of the persons' carry-on items, wherein at least some of the plurality of trolleys are provided at said upstream site;

at least one x-ray machine at the security check point, the x-ray machine being configured to x-ray the trolley, while one or more of said carry-on items is loaded onto the trolley;

means at the security check point for conducting a security check of the persons.

In a third aspect, the invention provides the use of a system according to the second aspect of the invention, wherein said upstream site is comprised in or located in the vicinity of a check-in zone of an airport terminal;

said downstream site is comprised in a departure or transit zone of the airport terminal, which is accessible to airplane passengers only.

The present invention relies on the general principle of providing a trolley for carry-on items, the trolley being made available to persons upstream of the security check point, i.e. before the persons pass the check point, and of allowing the trolley to pass through x-ray without unloading the carry-on items from the trolley. Accordingly, the persons are alleviated from loading their items onto the x-ray belt and possibly emptying items, such as laptops, onto the belt. When a person is at the downstream site, i.e. after he/she has passed the security check point, he/she simply needs to pick up the trolley loaded with his/her carry-on item. No time is wasted in connection with collecting a number of items, such as wallet, laptop, belt, cell phone, etc., and the risk of theft or disappearance of items due to other incidents is greatly minimized. Hence, time is saved and efficiency improved at both the upstream and the downstream side of the security check point.

As used herein, the term 'upstream' designates any zone, which persons pass or occupy prior to passing the security check point, and the term 'downstream' designates any zone, which persons pass or occupy after having passed the security check point. A site upstream of the security check point is to be understood as any position upstream, i.e. before the x-ray scanner and/or other security equipment, metal detector or search site, when seen in the direction of flow of persons and/or items. A site downstream of the security check point is to be understood as any position downstream, i.e. after the x-ray scanner and/or other security equipment, metal detector or search site, when seen in the direction of flow of persons and/or items.

The step of separating the person from the trolley at said upstream site may occur at any distance from the security check point, however for most applications it will be desirable that the step occurs at the check point it-self, i.e. at a distance of at most 5-10 meters, such as at most 2 meters form the x-ray apparatus. Likewise, the step of uniting the person and the trolley preferably occurs at the check point itself, i.e. at a distance of at most 5-10 meters, such as most 2 meters from the x-ray apparatus. In alternative embodiments of the invention, the steps of separating and/or uniting may occur at greater distances from the security check point.

The steps of x-raying the trolley at the security check point and performing the security check of the person at the security check point may occur essentially simultaneously, or at least both steps may occur while the trolley is out of the person's reach.

It should be understood that the step of x-raying may be supplemented or replaced by any other kind of security check of the trolley and the items loaded onto it, for example a manual search, scanning by a metal detector chemical testing for explosives, any kind of radiation, scanning and/or imaging, etc. It is within the ambit of the invention that some of the trolleys may be randomly picked for an enhanced check, and/or that selected items may be temporarily removed from the trolleys by security personnel for an enhanced search or check.

The security check of the person at the security check point may comprise the step of the person walking through a metal detector, a manual search, body scan, body temperature scanning or mapping, manual scanning by a handheld metal detector, etc.

In a further, independent aspect the invention also provides a trolley for use in a system, method and use as described herein. The trolley may preferably be made from or consist entirely of x-ray compliant materials, i.e. non-metallic materials, such as plastics or plastic composite materials. The trolley may comprise a monitor configured to display information to the person, and optionally a passenger identification interface for identifying the airplane passenger, whereby the monitor may be configured to display passenger-specific information. In a final independent aspect, the invention provides a trolley for carry-on items, such as hand luggage of airplane passengers, comprising a user identification interface for identifying the user, and a monitor configured to display user-specific information. The user-specific information may be pre-stored in an electronic memory of the trolley, or it may be provided via a communication interface, such as a wireless data transmission link, providing e.g. regularly updated flight information, such as gate and delay information, concerning the user's flight. The user identification interface may comprise at least one of a boarding-card reader, a credit card reader, a frequent-flyer card reader, or biometric identification means. The trolley may be made essentially from plastics or composite materials in order to allow it to pass X-ray.

LEGEND TO THE DRAWINGS

DESCRIPTION OF EMBODIMENTS OF THE INVENTION

Figure 1:
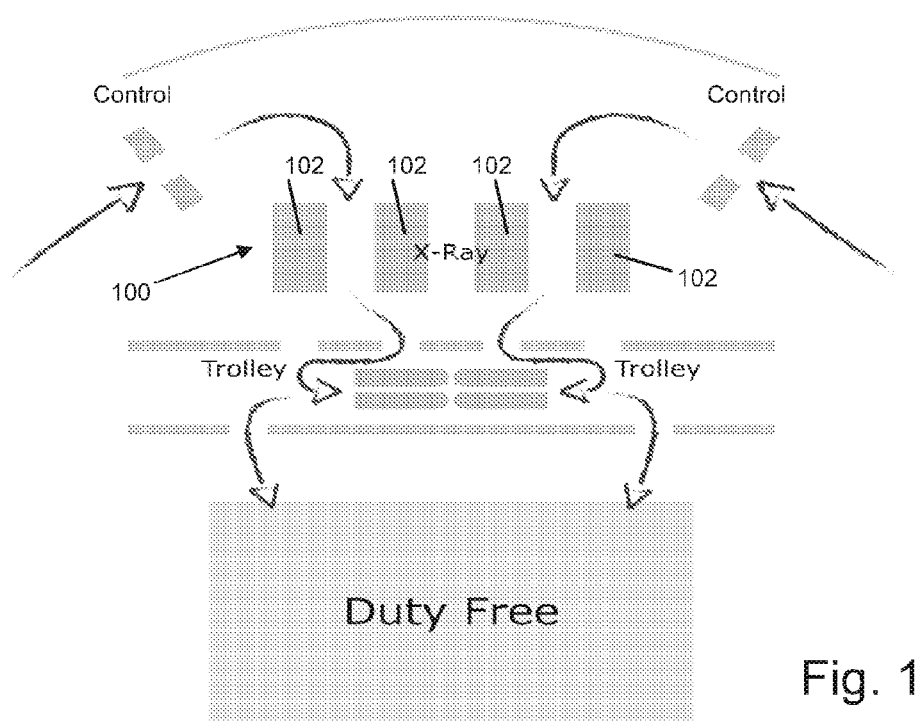
FIGS. 1 and 2 illustrate the flow of passengers and carry-on items in a prior art system for conducting security check at an airport.
Figure 2:
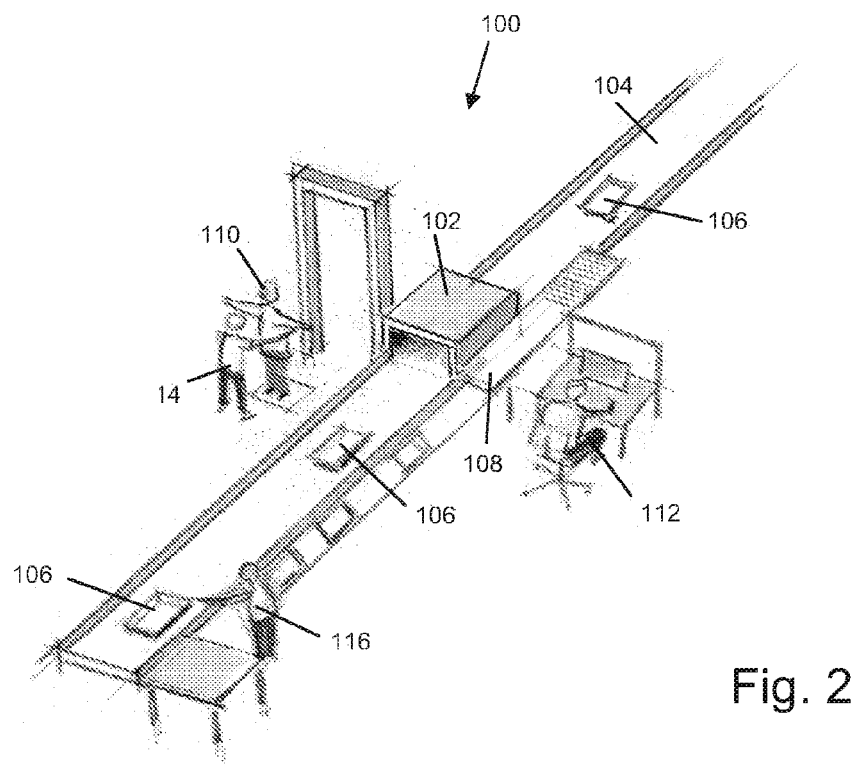

The flow of passengers through a security check point in a prior art airport terminal is illustrated in FIGS. 1 and 2 as discussed in the above section outlining the background of the invention. The prior art system and method illustrated in FIGS. 1 and 2 causes delays in the processing of persons and carry-on items at airports and other facilities.

Figure 3:
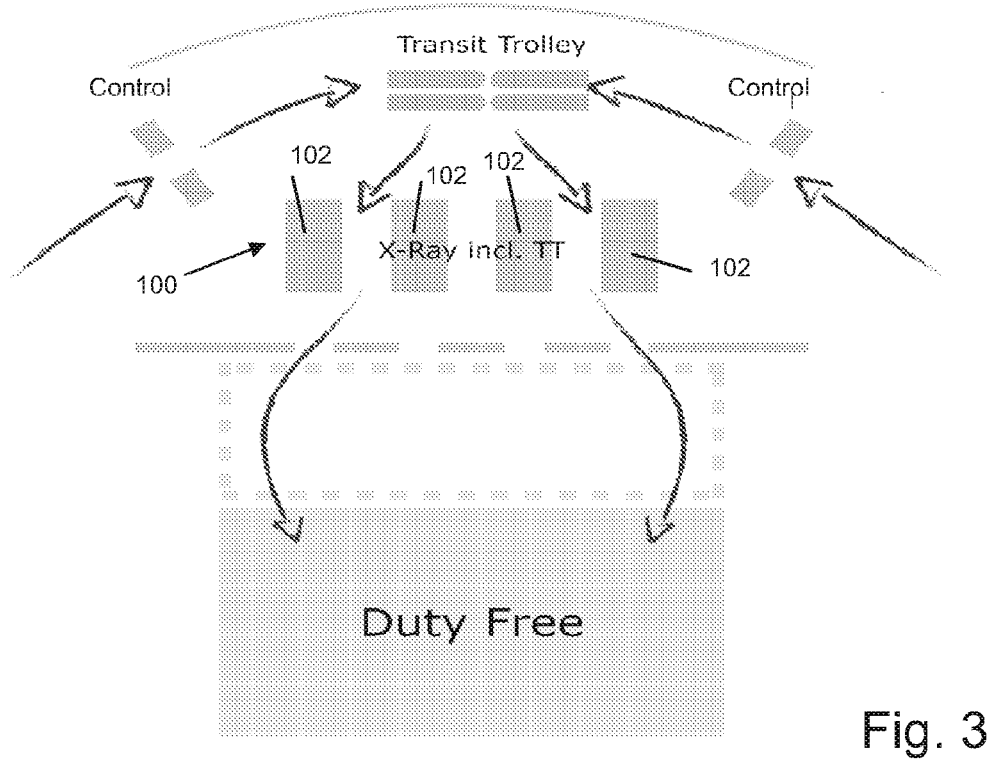
FIGS. 3 and 4 illustrate the flow of passengers and carry-on items in a method and a system according to the present invention.

FIG. 3 generally illustrates a method and a system according to the present invention. By way of example, the flow of passengers through a security check point in an art airport terminal is illustrated by arrows in FIG. 3. The passengers pass a control check point, at which the passengers' id and/or boarding cards are checked or verified. Subsequently, the passengers pick up a miniature luggage trolley configured to support their carry-on items, including coats, and configured to be conveyed through x-ray devices 102 along with the carry-on items, while the carry-on items are supported by the trolleys. While the trolleys with a person's carry-on items loaded onto it is passed through x-ray scanning at 102, a security check is conducted on the person himself/herself, e.g. by means of a metal detector and/or by manual search. At the downstream side of the security check point 100, the passengers are united with their luggage trolley, which still supports their hand luggage.

Figure 4:
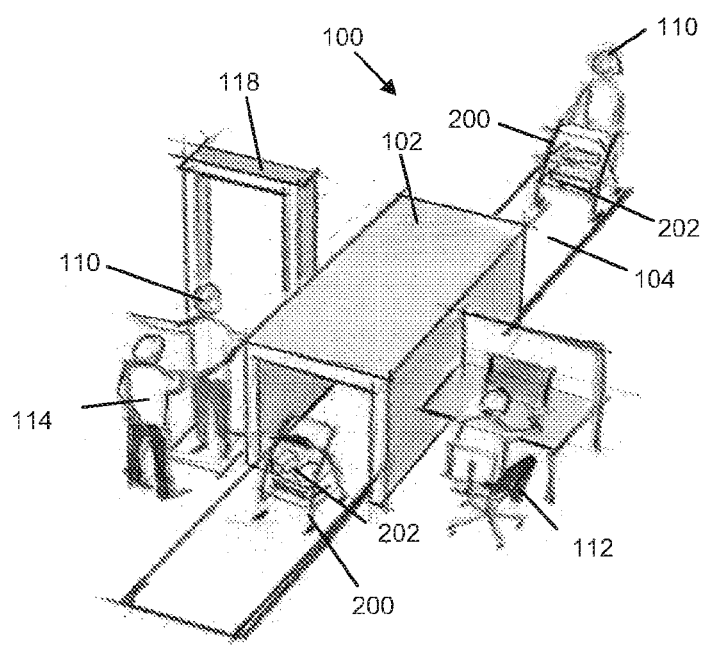
Figure 5:
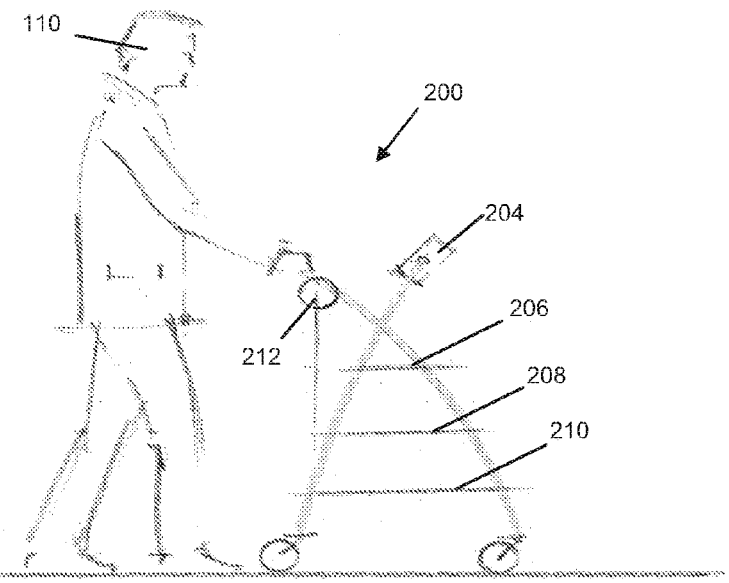
FIGS. 5-9 illustrate embodiments of a luggage trolley 200 for use in a system and method according to the present invention.
Figure 6:
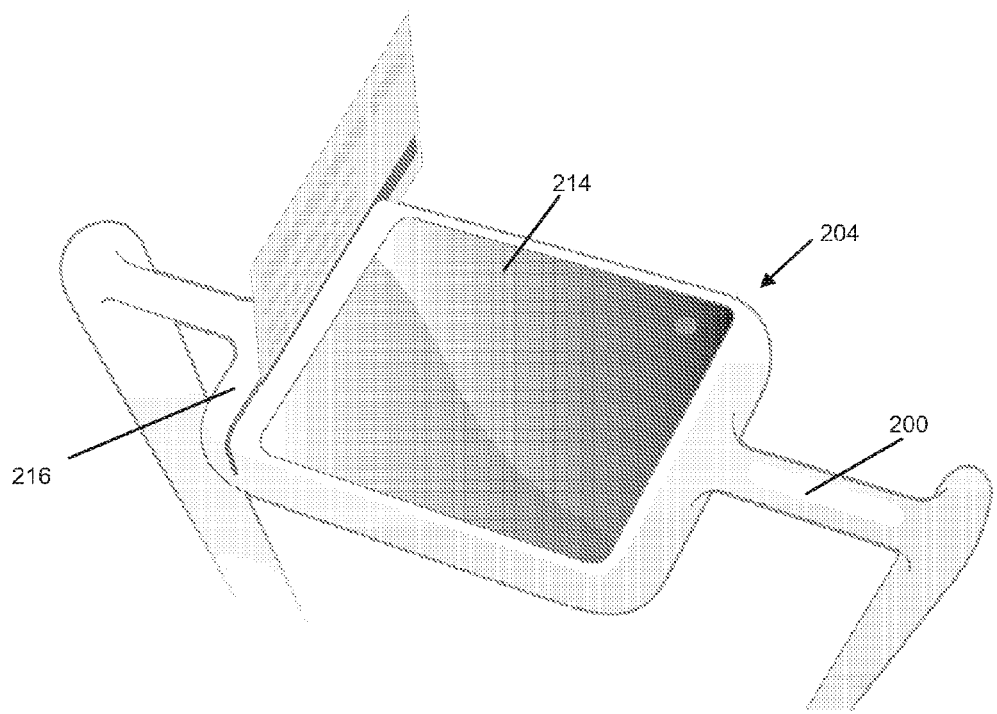

As shown in FIG. 4, miniature luggage trolleys 200 are conveyed through x-ray tunnel (x-ray scanner) 102, while the person, whose carry-on items are supported by the trolley 200, walks through metal detector 118 and is optionally searched by security officer 114. At the same time, security officer 112 monitors the scanned image of the x-ray apparatus.

The luggage trolley 200 is illustrated in more detail in FIGS. 5-9. The trolley comprises a display monitor 204 as well as shelves 206, 208 and 210 for the user's laptop, shopping items and hand luggage. A hanger 212 is provided for the user's coat. The display monitor 204 is configured to display information to the person on a display 214.

Figure 7:
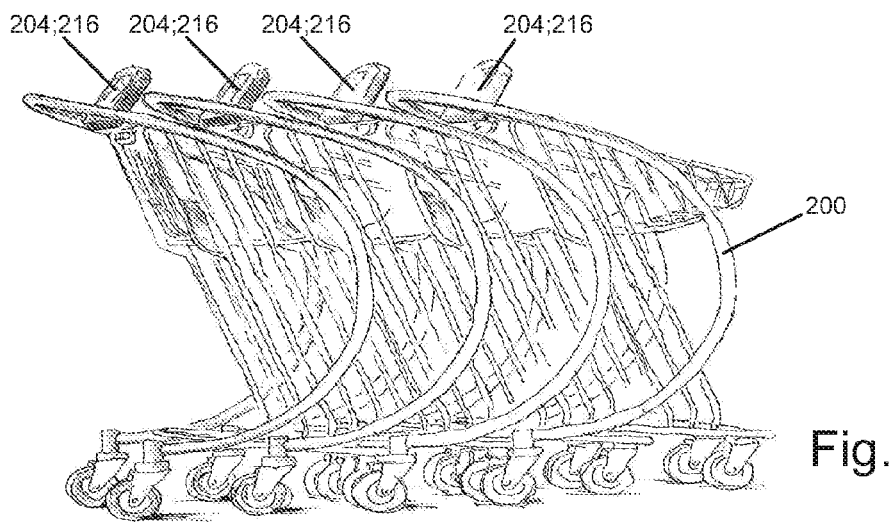
Figure 8:
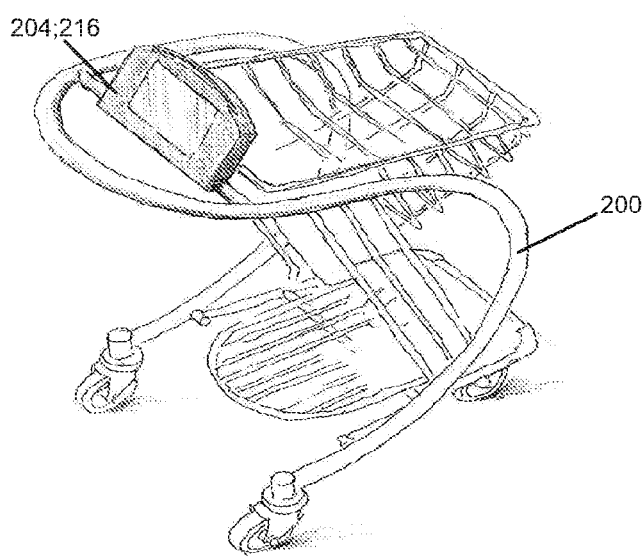
Figure 9:
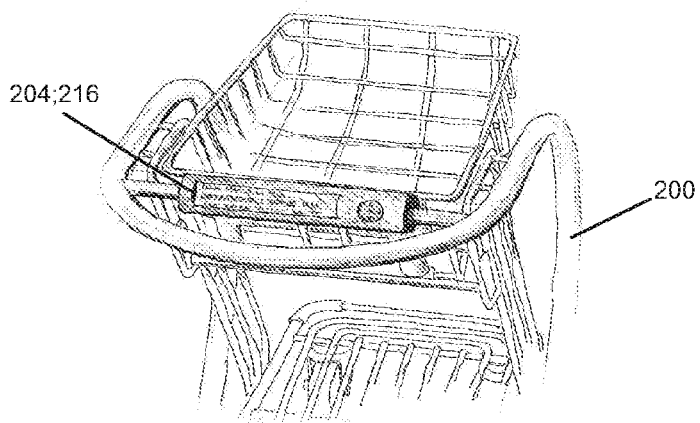

Further, the trolley 200 comprises a user identification interface 216 for identifying the user, e.g. an airplane passenger in order to allow the display monitor to display passenger-specific information. In the embodiment shown in FIG. 6, the user identification interface 216 is in the form of a boarding card reader, however other readers may be employed, such as a credit card reader, a frequent-flyer card reader and/or a biometric identification system. The display 214 and the monitor (or screen) 204 is configured to present user-specific information to the user, once the user has identified himself/herself via the user identification interface 216. For example, the display may be configured to show updated flight departure information, shopping advertisements, etc. FIGS. 7 and 8 illustrate a first design of the screen 204, and FIG. 9 illustrates a second design thereof.

In order to receive information to be displayed to the user at the display 214, the trolley 200 may comprise a communication interface for receiving data from an external unit. The system according to the invention may comprise a central server (not shown) and a data broadcasting system (not shown) connected to the central server, the data broadcasting system being configured to broadcast information, which can be received at each of the trolleys 200 via the communication interface. The trolley may in turn comprise computer means configured to conduct a person-specific selection of parts of the broadcasted information on the basis of the person's identity and to show said parts of the broadcasted information at the monitor.

The broadcasting system may for example comprise a wireless data transmission network and appropriately configured receivers at the trolleys for receiving wirelessly transmitted data.

The system may in one embodiment be configured to repeatedly broadcast updated versions of information and to update the displayed information at the monitor in accordance with the received updated versions of information. For example, the central server may broadcast flight departure information, including information on possible gate changes or delays. Hence, the user does not have to watch wall- or ceiling-mounted information monitors, but has the departure information readily at hand at his/her personal trolley 200. The display 204 may also display a map of, e.g., the airport, in which the trolley is operated, in order to facilitate the user's navigation through the airport.

The selected parts of the broadcasted information shown to the user may also comprise directions to one or more sites of specific interest to the person operating the trolley, such as e.g. directions to restaurants, in case the user has indicated via a user interface of the trolley that he/she intends to have a meal.

The trolleys 200 may be powered by rechargeable or disposable batteries. In one embodiment, the trolleys are rechargeable in a designated docking station there for (not shown).

In one embodiment, the monitors 214 and optionally the user-identification interface 216 may be provided as a retrofit to existing luggage trolleys.

The system according to the invention may further comprise means (not shown) for transferring the trolleys from the sit downstream of the security check point to the upstream site upon completion of the persons' use of the trolleys. For example, the trolleys 200 may be collected a designated collection areas and conveyed back to the upstream zone by conveyors, or simply pushed by hand.

The invention claimed is:

1. A method for transferring an airplane passenger and the passenger's carry-on items from a site upstream of a security check point comprised in or located in the vicinity of a check-in zone of an airport terminal to a site downstream of the security check point, said downstream site being comprised in a departure or transit zone of the airport terminal, which is accessible to airplane passengers only, the method comprising the steps of:
    providing a plurality of trolleys for said carry-on items;
    loading the person's carry-on items onto one of the trolleys at said upstream site;
    separating the person from the trolley at said upstream site;
    and subsequently:
    x-raying the trolley at said security check point while the carry-on items remain loaded onto the trolley;
    performing a security check of the person at said security check point;
    and subsequently:
    uniting the person and the trolley, while the carry-on items remain loaded onto the trolley;
    wherein
    each of the trolleys comprises a boarding-card reader for identifying the passenger;
    each of the trolleys comprises a monitor configured to display passenger-specific information;
    each of the trolleys is made essentially from plastics or composite materials;
    the method further comprising the steps of:
    identifying the person holding the trolley by reading the person's boarding card by means of the boarding-card reader;
    repeatedly broadcasting updated versions of data from a central server;
    receiving said data at a communication interface of each of the trolleys:
    carrying out, at each of said trolleys, a person-specific selection of parts of the broadcasted data solely on the basis of the identity of the person holding the trolley as determined at said step of identifying the person;
    displaying, at said monitor, said selected parts of the broadcasted data as said passenger-specific information, so that only those parts of the broadcasted information which have been selected solely on the basis of the person's identity are displayed at the monitor, and updating the displayed passenger-specific information at the monitor in accordance with the received updated versions of information; and
    making the trolley available to another person once the trolley has been released by the person previously holding it.

2. The method according to claim 1, wherein the security check of the person is conducted substantially simultaneously with the step of x-raying the trolley.

3. A system for facilitating the transfer of airplane passengers and the passengers' carry-on items from a site upstream of a security check point comprised in or located in the vicinity of a check-in zone of an airport terminal to a site downstream of the security check point, said downstream site being comprised in a departure or transit zone of the airport terminal, which is accessible to airplane passengers only, the system comprising:
    a plurality of trolleys, each of which is configured to be loaded with one of the persons' carry-on items, wherein at least some of the plurality of trolleys are provided at said upstream site;
    at least one x-ray machine at the security check point, the x-ray machine being configured to x-ray the trolley, while one or more of said carry-on items is loaded onto the trolley;
    means at the security check point for conducting a security check of the persons, wherein:
    each trolley comprises a boarding-card reader for identifying the passenger;
    each trolley comprises a monitor configured to display passenger-specific information;
    each trolley is made essentially from plastics or composite materials;

each of the trolleys comprises a communication interface for receiving data from an external unit; and wherein:

the system further comprises a central server and a data broadcasting system connected to the central server, the data broadcasting system being configured to repeatedly broadcast updated versions broadcast information, which can be received at each of the trolleys via said communication interface; and wherein each trolley configured to conduct a person-specific selection of parts of the broadcasted information solely on the basis of the identity of the person holding the trolley and to show said selected parts of the broadcasted information at the monitor, so that only those parts of the broadcasted information which have been selected solely on the basis of the person's identity, and to update the displayed information at the monitor in accordance with the received updated versions of information; and each trolley is configured for being made available to another person once the trolley has been released by the person previously holding it.

4. The system according to claim 3, wherein the system is configured to cause each person to be separated from the trolley, onto which his/her carry-on items are loaded, at the upstream site, and to cause the person to be united with the trolley at the downstream site.

5. The system according to claim 3, wherein the selected parts of the broadcasted information comprise airplane departure information.

6. The system according to claim 3, wherein the selected parts of the broadcasted information comprise directions to one or more sites of specific interest to the person operating the trolley.

7. The system according to claim 3 further comprising means for transferring the trolleys from the downstream site to the upstream site upon completion of the persons' use of the trolleys.

* * * * *